United States Patent [19]
Kolmanovsky et al.

[11] Patent Number: 6,035,640
[45] Date of Patent: Mar. 14, 2000

[54] CONTROL METHOD FOR TURBOCHARGED DIESEL ENGINES HAVING EXHAUST GAS RECIRCULATION

[75] Inventors: Ilya V. Kolmanovsky, Ypsilanti; Mrdjan J Jankovic; Miroslava Jankovic, both of Birmingham, all of Mich.

[73] Assignee: Ford Global Technologies, Inc., Dearborn, Mich.

[21] Appl. No.: 09/237,332

[22] Filed: Jan. 26, 1999

[51] Int. Cl.[7] .......................... F02M 25/07; F02B 33/44; F02B 47/08
[52] U.S. Cl. .......................................... 60/605.2; 123/676
[58] Field of Search .................................. 60/602, 605.2, 60/606, 607, 608; 123/676; 701/108

[56] References Cited

U.S. PATENT DOCUMENTS

| | | | |
|---|---|---|---|
| 4,985,302 | 1/1991 | Abo et al. .................................. | 60/602 |
| 5,158,063 | 10/1992 | Hosoda et al. ........................... | 123/676 |
| 5,278,762 | 1/1994 | Kawamura ............................... | 701/105 |
| 5,303,168 | 4/1994 | Cullen et al. ............................ | 701/299 |
| 5,322,047 | 6/1994 | Oliu et al. ............................... | 123/676 |
| 5,520,161 | 5/1996 | Klopp ...................................... | 123/676 |
| 5,704,340 | 1/1998 | Togai ...................................... | 123/676 |
| 5,738,126 | 4/1998 | Fausten ................................... | 123/568.21 |

FOREIGN PATENT DOCUMENTS 0 786 589 A1   7/1997   European Pat. Off. .

Primary Examiner—Tony M. Argenbright
Assistant Examiner—Arnold Castro
Attorney, Agent, or Firm—Jerome R. Drouillard; Allan J. Lippa

[57] ABSTRACT

A method of controlling the airflow into a compression ignition engine having an EGR and a VGT. The control strategy includes the steps of generating desired EGR and VGT turbine mass flow rates as a function of the desired and measured compressor mass airflow values and exhaust manifold pressure values. The desired compressor mass airflow and exhaust manifold pressure values are generated as a function of the operator-requested fueling rate and engine speed. The EGR and VGT turbine mass flow rates are then inverted to corresponding EGR and VGT actuator positions to achieve the desired compressor mass airflow rate and exhaust manifold pressure. The control strategy also includes a method of estimating the intake manifold pressure used in generating the EGR valve and VGT turbine positions.

7 Claims, 4 Drawing Sheets

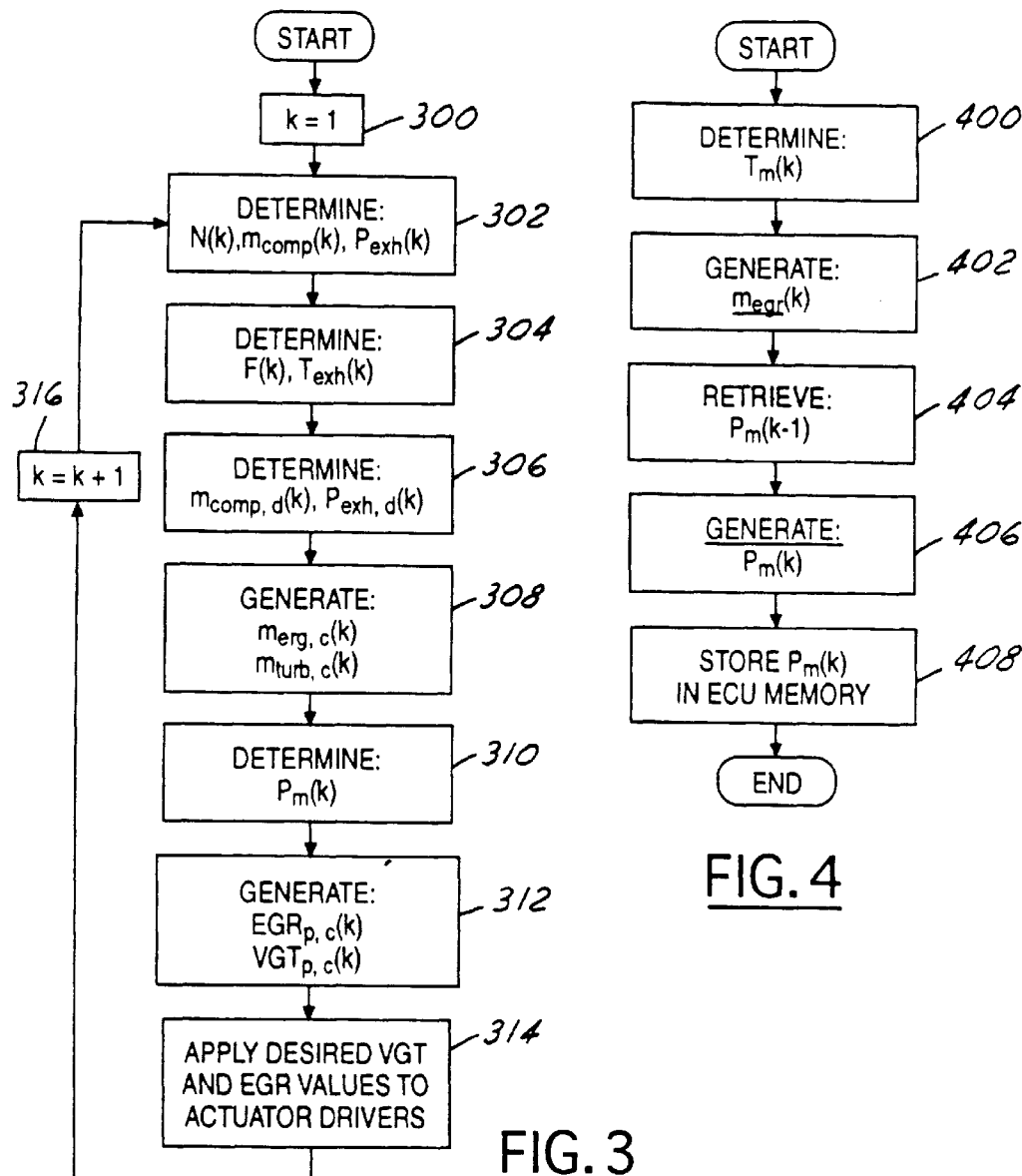
FIG. 3
FIG. 4
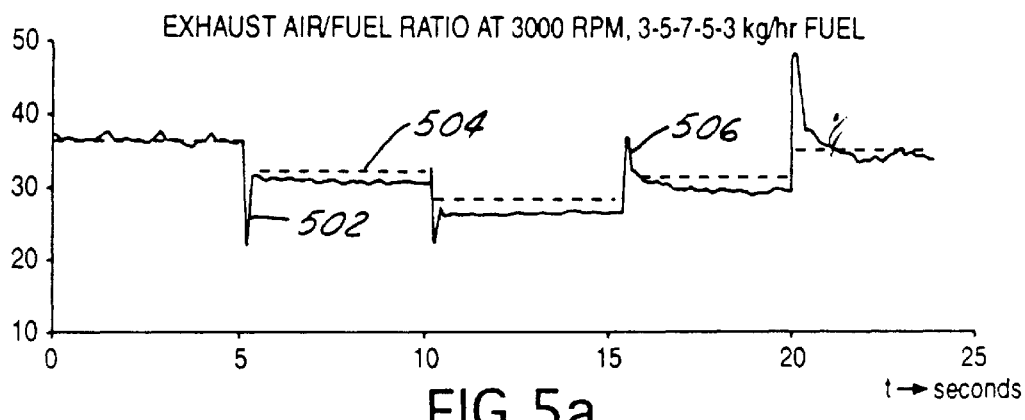
FIG. 5a

CONTROL METHOD FOR TURBOCHARGED DIESEL ENGINES HAVING EXHAUST GAS RECIRCULATION

This invention was made with Government support under Contract Nos. ZCB-4-13032-0Z, DOE-MRI, DE-AC30-83CH10093 DOE awarded by the U.S. Department of Energy. The government has certain rights in the invention.

TECHNICAL FIELD

This invention relates to turbocharged compression ignition engines having exhaust gas recirculation systems and, more particularly, to methods of controlling the air/fuel ratio and fraction of exhaust gas recirculation in diesel engines equipped with variable geometry turbochargers (VGT) and exhaust gas recirculation (EGR) systems.

BACKGROUND OF THE INVENTION

High performance, high speed diesel engines are often equipped with turbochargers to increase power density over a wider engine operating range, and EGR systems to reduce the production of NOx emissions.

Turbochargers use a portion of the exhaust gas energy to increase the mass of the air charge delivered to the engine combustion chambers. The larger mass of air can be burned with a larger quantity of fuel, thereby resulting in increased power and torque as compared to naturally aspirated engines.

A typical turbocharger consists of a compressor and turbine coupled by a common shaft. The exhaust gas drives the turbine which drives the compressor which, in turn, compresses ambient air and directs it into the intake manifold. Variable geometry turbochargers (VGT) allow the intake airflow to be optimized over a range of engine speeds. This is accomplished by changing the angle of the inlet guide vanes on the turbine stator. An optimal position for the inlet guide vanes is determined from a combination of desired torque response, fuel economy, and emissions requirements.

EGR systems are used to reduce NOx emissions by increasing the dilution fraction in the intake manifold. EGR is typically accomplished with an EGR valve that connects the intake manifold and the exhaust manifold. In the cylinders, the recirculated exhaust gas acts as an inert gas, thus lowering the flame and in-cylinder gas temperature and, hence, decreasing the formation of NOx. On the other hand, the recirculated exhaust gas displaces fresh air and reduces the air-to-fuel ratio of the in-cylinder mixture.

In compression ignition engines equipped with both VGT and EGR systems, optimal steady-state performance in terms of fuel economy and emissions is achieved by coordinating the operation of the two actuators. The steady-state performance of a compression ignition engine is directly related to the control system's ability to maintain the air/fuel ratio (AF) and the EGR fraction at desired values which depend upon engine speed and torque (as determined by the operator-requested fueling rate). Thus, in the engine control system the EGR fraction and AF ratio are the performance variables.

There are difficulties in regulating these performance variables to achieve optimum engine performance. In particular, the performance variables cannot be directly measured. In addition, there is significant interaction between the VGT and EGR actuators since both the VGT and EGR regulate gas flow from the exhaust manifold, and the exhaust gas directly affects the performance variables which are to be regulated. Consequently, there exists a need for a robust engine control strategy having stable regulation of the AF ratio and EGR fraction.

DISCLOSURE OF THE INVENTION

One object of the present invention is to provide an improved compression ignition engine control strategy.

Another object is to generate set points for the EGR valve and VGT position which correspond to desired AF ratio and EGR flow.

A further object is to provide a multivariable control scheme which coordinates the VGT and EGR actuators to achieve the desired set points.

According to the present invention, the foregoing and other objects and advantages are obtained by a method of controlling the airflow into a compression ignition engine having an EGR and a VGT. The method includes the steps of measuring the compressor mass airflow ($m_{comp}(k)$) and exhaust manifold pressure value ($P_{exh}(k)$); and generating a desired compressor mass airflow value ($M_{comp,d}(k)$) and a desired exhaust manifold pressure value ($P_{exh,d}(k)$) as a function of the operator-requested fueling rate ($F(k)$) and engine speed ($N(k)$). From these values the method generates a commanded exhaust gas recirculation mass flow value ($m_{egr,c}(k)$) and a commanded turbine mass flow value ($m_{turb,c}(k)$). These flow rates are then inverted to corresponding EGR and VGT actuator positions to achieve the desired compressor mass airflow rate ($m_{comp,d}(k)$) and exhaust manifold pressure ($_{exh,d}(k)$). This is accomplished by either measuring or estimating the intake manifold pressure ($P_m(k)$) and generating an EGR valve percent opening value ($EGR_p(k)$) and a VGT percent open value ($VGT_p(k)$) as a function of $m_{egr,c}(k)$ and $m_{turb,c}(k)$, respectively. These values are then transmitted to the exhaust gas recirculation valve and turbocharger turbine guide vanes, respectively, to drive the EGR valve and VGT vanes to the respective desired positions.

Other objects and advantages of the invention will become apparent upon reading the following detailed description and appended claims, and upon reference to the accompanying drawings.

BRIEF DESCRIPTION OF THE DRAWINGS

For a more complete understanding of the invention, reference should be made to the embodiments illustrated in greater detail in the accompanying drawings and described below by way of examples of the invention. In the drawings:

FIG. 3 is a logic diagram of an engine control method in accordance with one embodiment of the present invention;

FIG. 4 is a logic diagram of an intake manifold pressure estimator in accordance with one embodiment of the present invention;

FIG. 5a–b illustrate the AF ratio and EGR flow regulation in accordance with one embodiment of the present invention.

DESCRIPTION OF THE PREFERRED EMBODIMENT

Figure 1:
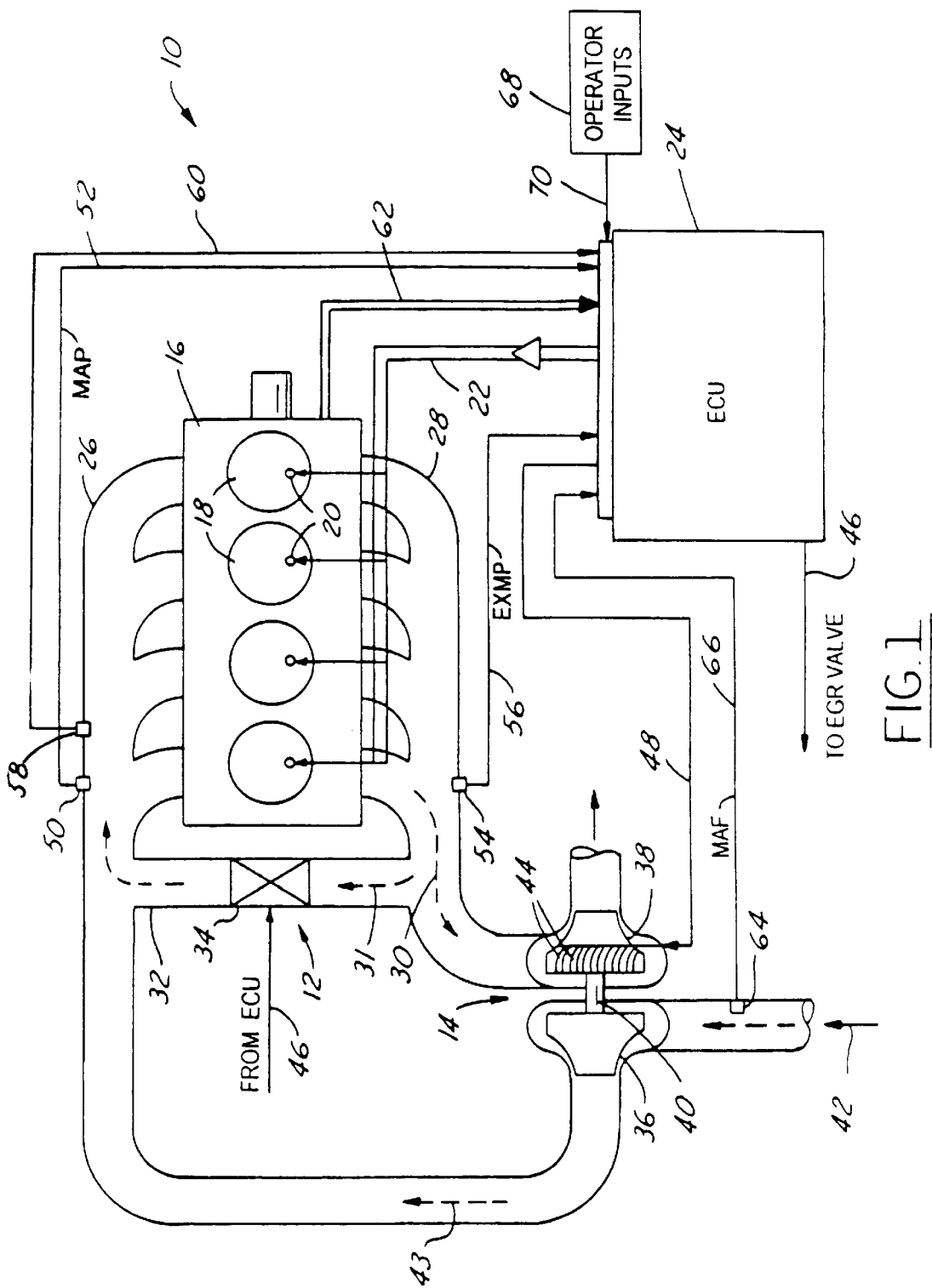
FIG. 1 is a schematic view of a compression ignition engine system having an EGR system and a VGT in accordance with one embodiment of the present invention.

Turning first to FIG. 1, there is shown a simplified schematic diagram of a compression ignition engine system 10 equipped with an exhaust gas recirculation (EGR) system 12 and a variable geometry turbocharger (VGT) 14. A representative engine block 16 is shown having four combustion chambers 18. Each of the combustion chambers 18 includes a direct-injection fuel injector 20. The duty cycle of the fuel injectors 20 is determined by the engine control unit (ECU) 24 and transmitted along signal line 22. Air enters the combustion chambers 18 through the intake manifold 26, and combustion gases are exhausted through the exhaust manifold 28 in the direction of arrow 30.

To reduce the level of NOx emissions, the engine is equipped with an EGR system 12. The EGR system 12 comprises a conduit 32 connecting the exhaust manifold 28 to the intake manifold 26. This allows a portion of the exhaust gases to be circulated from the exhaust manifold 28 to the intake manifold 26 in the direction of arrow 31. An EGR valve 34 regulates the amount of exhaust gas recirculated from the exhaust manifold 28. In the combustion chambers, the recirculated exhaust gas acts as an inert gas, thus lowering the flame and in-cylinder gas temperature and decreasing the formation of NOx. On the other hand, the recirculated exhaust gas displaces fresh air and reduces the air-to-fuel ratio of the in-cylinder mixture.

The turbocharger 14 uses exhaust gas energy to increase the mass of the air charge delivered to the engine combustion chambers 18. The exhaust gas flowing in the direction of arrow 30 drives the turbocharger 14. This larger mass of air can be burned with a larger quantity of fuel, resulting in more torque and power as compared to naturally aspirated, non-turbocharged engines.

The turbocharger 14 consists of a compressor 36 and a turbine 38 coupled by a common shaft 40. The exhaust gas 30 drives the turbine 38 which drives the compressor 36 which, in turn, compresses ambient air 42 and directs it (arrow 43) into the intake manifold 26. The VGT 14 can be modified as a function of engine speed during engine operation by varying the turbine flow area and the angle at which the exhaust gas 30 is directed at the turbine blades. This is accomplished by changing the angle of the inlet guide vanes 44 on the turbine 38.

All of the engine systems, including the EGR 12, VGT 14 and fuel injectors 20 are controlled by the ECU. For example, signal 46 from the ECU 24 regulates the EGR valve position, and signal 48 regulates the position of the VGT guide vanes 44.

In the ECU 24, the command signals 46, 48 to the EGR 12 and VGT 14 actuators are calculated from measured variables and engine operating parameters by means of a control algorithm. Sensors and calibratable lookup tables residing in ECU memory provide the ECU 24 with engine operating information. For example, an intake manifold pressure (MAP) sensor 50 provides a signal ($P_m$) 52 to the ECU indicative of the pressure in the intake manifold 26. Likewise, exhaust manifold pressure (EXMP) sensor 54 provides a signal ($P_{exh}$) 56 to the ECU 24 indicative of the pressure in the exhaust manifold 28. Further, an intake manifold temperature sensor 58 provides a signal ($T_m$) 60 to the ECU 24 indicative of the intake manifold temperature. A mass airflow (MAF) sensor 64 also provides a signal ($m_{comp}$) 66 indicative of the compressor mass airflow to the ECU 24.

Additional sensory inputs can also be received by the ECU along signal line 62 such as engine coolant temperature, engine speed, and throttle position. Additional operator inputs 68 are received along signal 70 such as the accelerator pedal position or other fueling request input.

Figure 2:
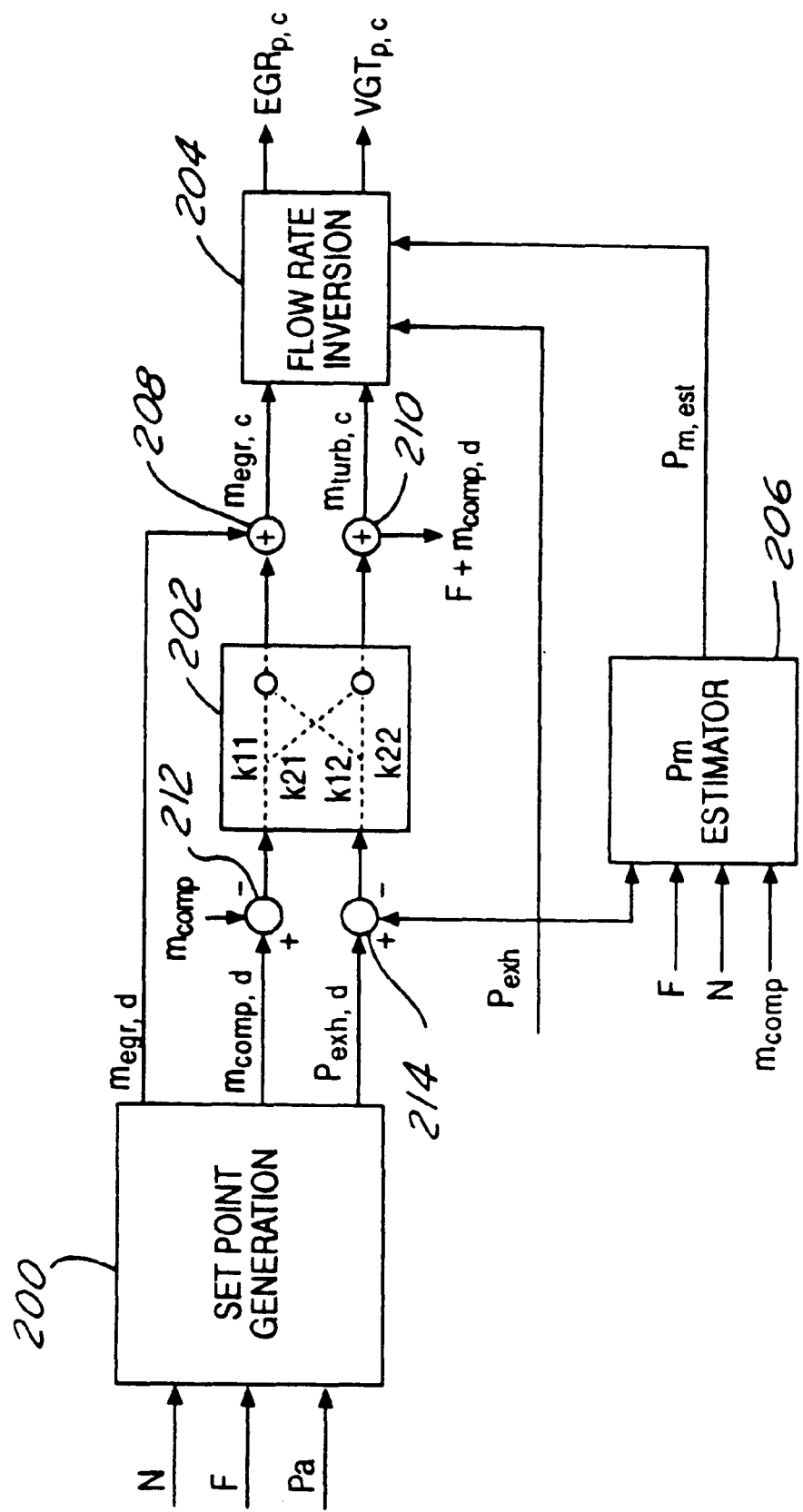
FIG. 2 is a block diagram of an engine control system in accordance with one embodiment of the present invention.

The engine control methods described herein apply to all turbocharged compression ignition engines equipped with EGR systems, regardless of the type of fuel used. Thus, it is to be understood that references to diesel engines are equally applicable to other compression ignition engines as well. In addition, throughout the specification, the following notations are used in describing measured or calculated variables:

F desired fuel mass flow rate
N engine speed (RPM)
$P_m$ intake manifold pressure (MAP)(kPa)
$P_{exh}$ exhaust manifold pressure (EXMP)(kPa)
$P_a$ ambient (barometric) pressure (kPa)
$m_{comp}$ compressor mass flow rate (MAF)(kg/s)
$m_{cyl}$ cylinder mass flow rate (kg/s)
$m_{egr}$ EGR mass flow rate (kg/s)
$AF_d$ desired air/fuel ratio
$AF_s$ stoichiometric air/fuel ratio (14.6 for diesel)
$EGR_d$ desired EGR mass flow as a percentage of total intake flow
$\tau$ sampling time
$\gamma$ ratio of specific heat constants ($\gamma=c_p/c_v$, 1.4)
$T_m$ intake manifold temperature (K)
$T_{exh}$ exhaust manifold temperature (K)
$T_a$ ambient air temperature (K)
$V_m$ intake manifold volume
$\eta^*$ total efficiency of the turbocharger
$EGR_p$ percent opening of the EGR valve
$VGT_p$ percent opening of the VGT actuator FIG. 2 is a block diagram of an engine control system according to one embodiment of the present invention. The control system has four major components: (1) control block 200 generates desired set points for the compressor flow rate ($m_{comp,d}$), exhaust manifold pressure ($P_{exh,d}$), and EGR mass airflow ($m_{egr,d}$); (2) control block 202 is the feedback system to achieve the desired set points for $m_{comp,d}$ and $P_{exh,d}$; (3) control block 204 generates the EGR and VGT percent openings to regulate the performance variables; and (4) control block 206 dynamically estimates the intake manifold pressure ($P_m$).

Control block 200 receives as inputs the engine speed (N), requested fueling rate (F) and ambient pressure (Pa), and generates set points for the compressor flow rate ($m_{comp,d}$) and exhaust manifold pressure ($P_{exh,d}$) in order to achieve the desired AF ratio ($AF_d$) and EGR flow fraction ($EGR_d$). These desired values are obtained by optimizing the steady-state fuel consumption and emissions based on the engine mapping data. Control block 200 also generates a desired value for the EGR mass flow rate ($m_{egr,d}$) as a function of the AF and EGR schedules.

The desired compressor mass airflow and desired EGR mass airflow are defined as follows:

$$m_{comp,d}(AF_d, EGR_d) = [AF_s EGR_d + AF_d(1-EGR_d)]F \quad (1)$$

$$m_{egr,d}(AF_d, EGR_d) = ((EGR_d/(1-EGR_d)))m_{comp,d} \quad (2)$$

The set point for the intake manifold pressure is obtained by equating the mass airflow rates into and out of the intake manifold:

$$m_{cyl} = m_{comp,d} + m_{egr,d} \quad (3)$$

Expressed another way, the mass flow rate into the cylinders is an approximately linear function of the intake manifold pressure, $P_m$. Accordingly, $m_{cyl}$ can be defined as:

$$m_{cyl} = \alpha(N, T_m) P_m \quad (4)$$

where $\alpha(N,T_m)$ is the engine pumping coefficient related to the speed and volumetric efficiency of the engine. Hence, the desired $P_m$ set point is obtained as:

$$P_{m,d} = (m_{comp,d} + T_{egr,d})/\alpha((N,T_m) \quad (5)$$

From the foregoing, the desired set point for the exhaust manifold pressure is obtained as follows:

$$P_{exh,d} = P_a/[1 - (T_a/\eta^* T_{exh}) ((P_{m,d}/P_a)^{(\gamma-1)/\gamma} - 1)]^{\gamma/(\gamma-1)} \quad (6)$$

In equation (6), the total turbocharger efficiency, $\eta^*$, is the product of the turbine and compressor isentropic efficiencies, and the turbocharger mechanical efficiency. A sufficiently accurate fixed value can be obtained from the turbocharger manufacturer's data, however, it can also be scheduled based on the engine operating condition. Specifically, moderately increasing the value of $\eta^*$ in response to an increase in requested fuel, results in improved fuel economy as compared to the fixed value.

As an alternative to performing the computations of equations (1) through (6) in real time, the values of set points for $m_{comp,d}$ (N,F), $P_{exh,d}$ (N,F,$P_a$) and $m_{egr,d}$ (N,F) can be stored in lookup tables (wherein $T_a$ can be assumed to be constant) to be retrieved at execution time. This approach allows certain special operating conditions, such as deceleration fuel shut-off where AF is infinite, to be handles in a systematic way.

Given the desired set points $m_{comp,d}$ and $P_{exh,d}$ from equations (1) and (6), the feedback controller 202 calculates desired values for EGR flow and VGT flow to achieve the desired compressor flow rate and exhaust pressure. Referring to FIG. 2, at node 212, a compressor flow error term is established which is equal to the difference between the desired and measured compressor mass flow rates ($m_{comp} - m_{comp,d}$). Similarly, at node 214, an exhaust pressure error term is generated which is equal to the difference between the desired and actual exhaust manifold pressures ($P_{exh,d} - P_{exh}$). Thus, the commanded EGR flow ($m_{egr,c}$) and commanded turbine flow ($m_{turb,c}$) are obtained as a multivariable feedback of the compressor flow error and the exhaust manifold pressure errors added to their respective set point values (nodes 208, 210):

$$m_{egr,c} = m_{egr,d} + K_{11}(m_{comp} - m_{comp,d}) + K_{12}(P_{exh} - P_{exh,d}) \quad (7)$$

$$m_{turb,c} = m_{comp,d} + F - K_{21}(m_{comp} - m_{comp,d}) + K_{22}(P_{exh} - P_{exh,d}) \quad (8)$$

The feedback gains, $K_{ij}$, have values greater than or equal to zero, and are calibrated for optimal transient performance of the engine as well as accurate steady-state regulation. Furthermore, the gains can be constant or indexed with respect to engine speed and the requested fueling rate. When measured or estimated values for $P_m$ and $P_{exh}$ are used to determine the VGT and EGR openings in block 204, the controller can become unstable if the gains $K_{12}$ and $K_{22}$ are too small. Stability is not a concern, however, if the set point values, $P_{m,d}$ and $P_{exh,d}$ are used in determining the VGT and EGR openings. This is an alternative to the flow rate inversion scheme detailed in FIG. 2. This method is advantageous in that the intake manifold pressure can be either measured or estimated. However, the flow inversion has reduced accuracy as compared to the method of FIG. 2.

Given the EGR and VGT flow rates from controller block 202, EGR and VGT actuator opening commands are computed at block 204, ranging from 0.0 for fully closed, to 1.0 for fully open. To compute the EGR opening signal, an inversion of the orifice formula describing the EGR valve is required. Thus, the EGR opening is computed from the following equation describing the flow through the EGR valve orifice:

$$m_{egr} = (P_{exh}/P_{nom}) (T_{nom}/T_{exh})^{1/2} \Psi_{egr} (EGR_p) G_s (P_m/P_{exh}) \quad (9)$$

where $\Psi_{egr}$ is an experimentally determined characteristic which incorporates geometric properties of the EGR valve such as the area of the valve opening and the discharge coefficient, $T_{nom}$ and $P_{nom}$ are the nominal upstream temperature and pressure values used to determine $\Psi_{egr}$, and $G_s$ is the subsonic flow correction factor for the EGR given by:

$$G_s (P_m/P_{exh}) = \gamma^{1/2} (2/(\gamma+1))^{(\gamma+1)/(2(\gamma-1))}$$

for $(P_m/P_{exh}) \leq (2/(\gamma+1))^{\gamma/(\gamma-1)}$, otherwise:

$$G_s (P_m/P_{exh}) = [(2\gamma/(\gamma-1)) ((P_m/P_{exh})^{2/\gamma} - (P_m/P_{exh})^{(\gamma+1)/\gamma})]^{1/2}$$

From equation (9), the commanded value of the EGR percent opening can be computed as an inversion as follows:

$$EGR_{p,c} = \Psi_{egr}^{-1}((T_{exh}/T_{nom})^{1/2} m_{egr,c} P_{nom}/(P_{exh} G_s(P_m/P_{exh}))) \quad (10)$$

for $(P_m/P_{exh}) < 1$, otherwise:

$$EGR_{pc} = 0$$

Similarly, the commanded VGT opening position is computed from the corresponding flow through the orifice formula assuming that the pressure at the turbine exit is equal to the ambient air pressure:

$$VGT_{p,c} = \Psi_{vgt}^{-1}((T_{exh}/T_{nom})^{1/2} m_{turb,c} P_{nom}/(P_{exh} G_s(P_a + \epsilon/P_{exh}))) \quad (11)$$

wherein $\Psi_{vgt}$ is the actuator characteristic determined experimentally which incorporates the geometric properties of the turbine such as the flow area of the opening and the discharge coefficient of the VGT. The correction factor $\epsilon$ is a small constant determined experimentally included to account for the fact that turbine flow is 0 at a pressure ratio less than 1.

From equations (10) and (11), the actuator commands, $EGR_{p,c}$ and $VGT_{p,c}$, determine the percent opening of the two actuators.

In equations (10) and (11), the intake and exhaust manifold pressure signals $P_m$ and $P_{exh}$ are assumed to be measured or estimated values. Alternatively, as mentioned above with regard to the feedback gains, the set point values $P_{m,d}$ and $P_{exh,d}$ from equations (5) and (6), respectively, could be used instead. In such a case, the feedback gains $K_{12}$ and $K_{22}$ can be small values without compromising system stability, including $K_{12} = 0$ and $K_{22} = 0$.

In addition, rather than measuring the intake manifold pressure, an estimated value can be used as shown in block 206 of FIG. 2. This estimate for $P_m$ allows the MAP sensor 50 (FIG. 1) to be eliminated, or provides a system for failure mode detection in the case of a sensor failure.

From the ideal gas law, the dynamics of the intake manifold pressure is defined as:

$$dP_m/dt = (RT_m/V_m)(m_{comp} + m_{egr} - m_{cyl}) \quad (12)$$

wherein R represents the difference between the pressure specific heat constant and volume specific heat constant.

In equation (12), the compressor mass flow rate is a measured value, and estimates of the EGR and cylinder mass flow rates are obtained from equations (9) and (4) using an estimate of the intake manifold pressure. The intake manifold pressure estimate $P_m$ is computed recursively from the following equation:

$$P_m(k)=(1-(TRT_m(k)/V_m)\alpha((N(k),T_m(k)))P_m(k-1)+\ldots(TRT_m(k)/V_m)(m_{comp}(k)+m_{egr}(k)) \quad (13)$$

where:

$$m_{egr}(k)=(P_{exh}(k)/P_{nom})(T_{nom}/T_{exh}(k))^{1/2}\ldots\Psi_{egr}(EGR_p(k))G_s(P_m(k-1)/P_{exh}(k)) \quad (14)$$

In equation (13) the index k represents the discrete time instant $t=k\tau$. The estimated intake manifold pressure $P_m$ can then be substituted in the control method outlined above in place of the actual intake manifold measurement.

FIG. 3 describes the logic routine executed by the engine controller to drive the EGR valve and VGT position based on the compressor airflow and exhaust pressure set points. This logic routine resides in the ECU memory and is executed as part of the foreground logic routine used to control the engine operating conditions.

Starting at an initial time of k=1 (step 300), measurements of engine speed, compressor mass airflow, and exhaust manifold pressure are determined at step 302. Referring to FIG. 1, the engine speed is received by the ECU along signal line 62, the compressor mass airflow value is provided by MAF sensor 64, and the exhaust manifold pressure value is measured by EXMP sensor 54.

In step 304, the desired fueling rate is determined as a function of the accelerator pedal position (signal 70 of FIG. 1) and engine speed from a lookup table residing in ECU memory. Similarly, the exhaust manifold temperature is measured by a sensor (not shown) or can be determined from a lookup table indexed by engine speed, the requested fueling rate, and the desired AF ratio.

In step 306, desired set points for compressor mass airflow and the exhaust manifold pressure (control block 200 of FIG. 2) are generated from lookup tables corresponding to the desired fueling rate and engine speed. The lookup table values are created using equations (1) and (6) indexed by the desired AF ratio and desired EGR flow fraction.

In step 308, the commanded EGR and turbine mass airflows are calculated from equations (7) and (8).

The intake manifold pressure is determined in step 310. This value can be measured by MAP sensor 50 of FIG. 1, or estimated as in equation (13).

In step 312, percent opening values for the EGR and VGT are determined from equations (10) and (11) (control block 204 of FIG. 2). These commanded values are then applied to the actuator drivers of the EGR and VGT along signal lines 46 and 48, respectively of FIG. 1. The clock timer is then incremented at step 316 and the process repeats.

FIG. 4 describes the logic flow diagram of the intake manifold pressure estimator which can be used in place of the measured value in step 310 of FIG. 3. The estimator begins at step 400 by determining the intake manifold temperature. This is determined by intake manifold temperature sensor 58 of FIG. 1. In step 402 the estimated EGR mass airflow is computed according to equation (14). The value of the intake manifold pressure computed from the previous logic cycle is then recalled at step 404. A new estimate of the intake manifold pressure is then computed from equation (13) in step 406, and stored in ECU memory in step 408.

Figure 5B:
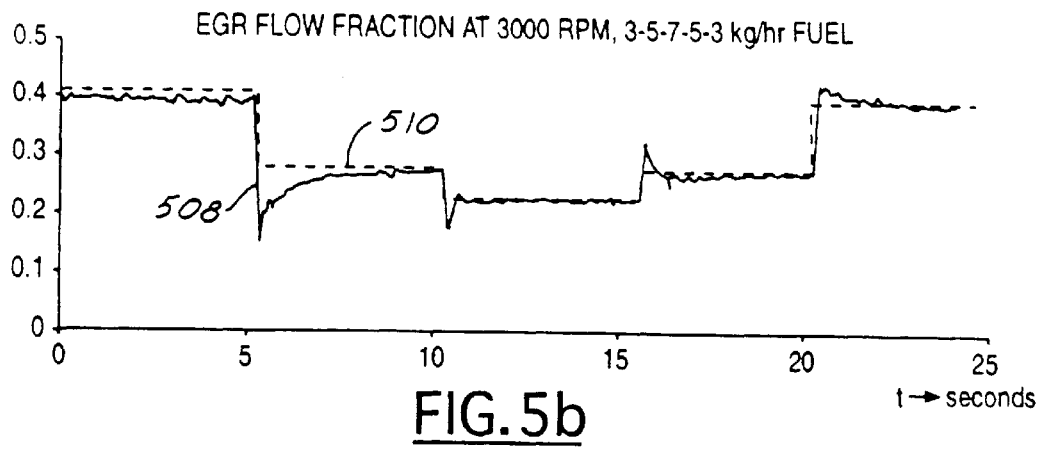

The performance of the novel control method is shown in FIGS. 5a14 5b and 6a–6b. FIGS. 5a and 5b show the set point regulation for the exhaust air/fuel ratio (line 502) and the EGR flow fraction (line 508) corresponding to the following steps in the fueling rate: 3–5–7–5–3 kg/h at 3000 RPM. The commanded air/fuel ratio and EGR flow fraction is shown by lines 504 and 510, respectively. As can be appreciated, the control method exhibits very fast response of the air/fuel ratio (region 506) to increases in fueling demand.

Figure 6A:
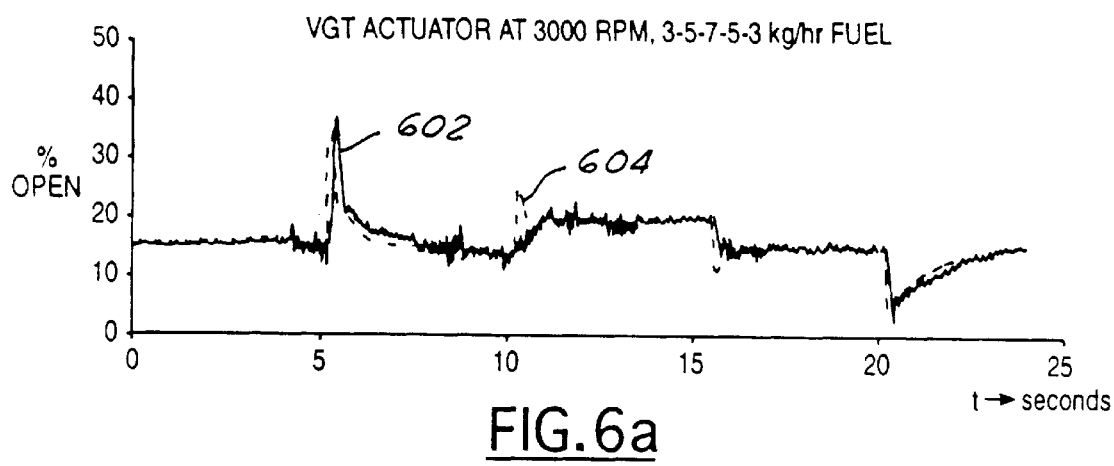
FIGS. 6a–b illustrate the VGT and EGR actuator position corresponding to the AF ratio and EGR flow fraction of FIGS. 5a and 5b.
Figure 6B:
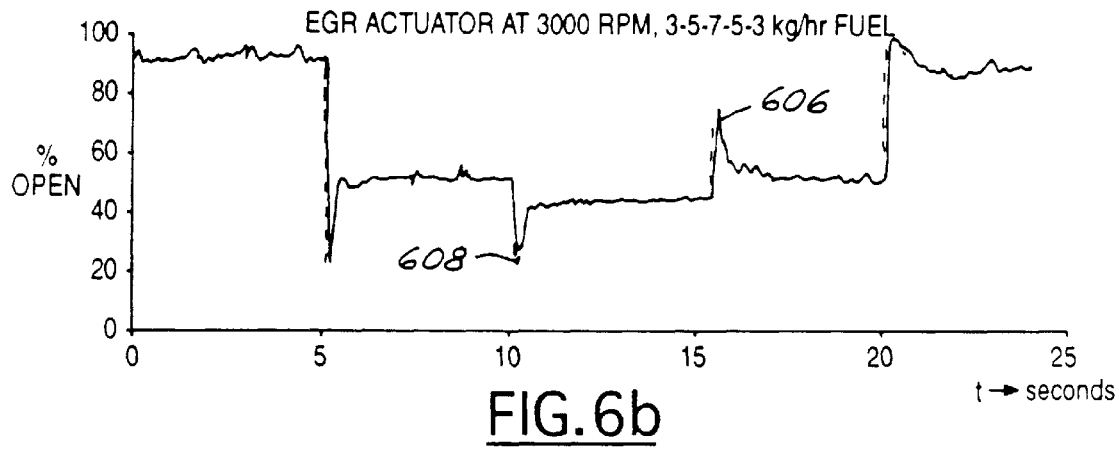

FIGS. 6a and 6b illustrate the EGR and VG actuator positions for the same fueling steps as in FIGS. 5a and 5b at 3000 RPM. FIG. 6a shows the measured (line 602) and commanded (line 604) VGT actuator percent openings, and FIG. 6b shows the measured (line 606) and commanded (line 608) EGR percent opening.

While the invention has been described in connection with one or more embodiments, it will be understood that the invention is not limited to those embodiments. For example, instead of measuring the compressor mass air flow, it can be estimated from the measured intake and exhaust manifold pressures and intake manifold temperature signals. The structure of the control algorithm of FIG. 2 would remain the same, except that an estimate of the compressor mass air flow is used instead of its measured value and the measured intake manifold pressure is used in place of its estimated value. Accordingly, the invention covers all alternatives, modifications, and equivalents, as may be included within the spirit and scope of the appended claims.

What is claimed is:

1. A method of controlling the air-fuel ratio and exhaust gas recirculation (EGR) fraction in a compression ignition engine having an EGR system including a valve connecting an intake manifold and exhaust manifold of the engine, and a variable geometry turbocharger including a compressor connected to a turbine having guide vanes, the compressor in communication with the intake manifold and the turbine guide vanes in communication with the exhaust manifold, the method comprising the steps of:

determining an engine speed value (N(k)) indicative of the current engine speed;

determining a fueling rate value (F(k)) to be injected as a function of N(k) and the operator-requested fueling rate;

generating a desired compressor airflow value ($m_{comp,d}$(k)) as a function of F(k) and N(k);

generating a desired exhaust manifold pressure value ($P_{exh,d}$(k)) as a function of F(k) and N(k);

determining an exhaust pressure value ($P_{exh}$(k)) indicative of the exhaust manifold pressure;

determining an mass airflow value ($m_{comp}$(k)) indicative of the compressor mass airflow;

generating a commanded EGR mass flow value ($m_{egr,c}$(k)) and a commanded turbine mass flow value ($m_{turb,c}$(k)) as a function of $m_{comp,d}$(k), $P_{exh,d}$(k), $m_{comp}$(k), and $P_{exh}$(k);

determining an intake pressure value ($P_m$(k)) indicative of the intake manifold pressure;

generating an EGR valve percent opening command ($EGR_{p,c}$(k)) and a variable geometry turbocharger percent open command ($VGT_{p,c}$(k)) as a function of $m_{egr,c}$(k) and $m_{turb,c}$(k), respectively; and applying $EGR_{p,c}$(k) and $VGT_{p,c}$(k) to the EGR valve and turbine guide vanes, respectively, to drive the EGR valve and turbine guide vanes to the respective desired percent open values.

2. The method as set forth in claim 1 wherein the step of generating a desired compressor airflow value ($m_{comp,d}$(k)) further comprises the steps of:

retrieving a desired air/fuel ratio value ($AF_d(k)$) from a table of values indexed by $F(k)$ and retrieving a desired exhaust gas recirculation flow fraction value ($EGR_d(k)$) from a table of values indexed by $F(k)$ and $N(k)$; and generating a desired compressor airflow value ($m_{comp,d}(k)$) according to the following equation:

$$m_{comp,d}(k)=[AF_s EGR_d(k)+AF_d(k)(1-EGR_d)]F(k)$$

wherein $AF_s$ represents the stoichiometric air/fuel ratio.

3. The method as set forth in claim 1 wherein the step of generating a desired exhaust manifold pressure value ($P_{exh,d}(k)$) further comprises the following steps:

generating a temperature value ($T_{exh}(k)$) indicative of the exhaust manifold temperature; and generating a desired exhaust manifold pressure value ($P_{exh,d}(k)$) according to the following equation:

$$P_{exh,d}(k)=P_a/[1-(T_a/\eta^* T_{exh}(k))((P_{m,d}(k)/P_a)^{(\gamma-1)/\gamma}-1)]^{\gamma/(\gamma-1)}$$

wherein $T_a$ and $P_a$ represents the ambient air temperature and pressure, respectively, $P_{m,d}(k)$ represents the desired intake manifold pressure, $\eta^*$ represents the total turbocharger efficiency, and $\gamma$ represents the ratio of the pressure specific heat constant to volume specific heat constant.

4. The method as set forth in claim 1 wherein the step of generating a commanded exhaust gas recirculation mass flow value ($m_{egr,c}(k)$) and a commanded turbine mass flow value ($m_{turb,c}(k)$) further comprises the steps of:

generating an airflow value ($m_{comp}(k)$) indicative of the compressor mass airflow;

generating an exhaust pressure value ($P_{exh}(k)$) indicative of the exhaust manifold pressure;

generating a commanded exhaust gas recirculation mass flow value ($m_{egr,c}(k)$) according to the following equation:

$$m_{egr,c}(k)=m_{egr,d}(k)+K_{11}(m_{comp}(k)-m_{comp,d}(k))+\ldots K_{12}(P_{exh}(k)-P_{exh,d}(k))$$

and;

generating a commanded turbine mass flow value ($m_{turb,c}(k)$) according to the following equation:

$$m_{turb,c}(k)=m_{comp,d}(k)+F(k)-K_{21}(m_{comp}(k)-m_{comp,d}(k))+K_{22}(P_{exh}(k)-P_{exh,d}(k))$$

wherein $K_{11}$, $K_{12}$, $K_{21}$, and $K_{22}$ represent controller feedback gains having values greater than or equal to zero.

5. The method as set forth in claim 1 wherein the step of determining an intake pressure value ($P_m(k)$) includes the step of measuring the intake manifold pressure with a manifold absolute pressure sensor.

6. The method as set forth in claim 1 wherein the step of determining an intake pressure value ($P_m(k)$) further comprises the steps of:

determining the intake manifold temperature ($T_m(k)$);

determining an exhaust gas recirculation valve mass airflow value ($m_{egr}(k)$); and calculating an intake pressure value ($P_m(k)$) according to the following equation $$P_m(k)=(1-(TRT_m(k)/V_m)\alpha((N(k),T_m(k)))P_m(k-1)+\ldots(TRT_m(k)/V_m)(m_{comp}(k)+m_{egr}(k))$$

wherein R represents the difference between the pressure specific heat constant and volume specific heat constant, $\tau$ represents the sampling clock time, $V_m$ represents the intake manifold volume, and $\alpha(N(k),T_m(k))$ is the engine pumping coefficient.

7. The method as set forth in claim 1 wherein the step of generating an exhaust gas recirculation valve percent opening command ($EGR_{p,c}(k)$) and a variable geometry turbocharger percent open command ($VGT_{p,c}(k)$) includes the steps of:

generating a temperature value ($T_{exh}(k)$) indicative of the exhaust manifold temperature;

generating an exhaust pressure value ($P_{exh}(k)$) indicative of the exhaust manifold pressure;

computing $EGR_{p,c}(k)$ according to the following equation:

$$EGR_{p,c}(k)=\Psi_{egr}^{-1}((T_{exh}(k)/T_{nom})^{1/2}m_{egr,c}(k)P_{nom}/(P_{exh}(k)G_s(P_m(k)/P_{exh}(k))))$$

for $(P_m(k)/P_{exh}(k))<1$, otherwise:

$$EGR_{p,c}=0$$

wherein $\Psi_{egr}$ is the EGR valve characteristic dependent upon the area of the valve opening and discharge coefficient, $T_{nom}$ and $P_{nom}$ are nominal upstream temperature and pressure values, and $G_s$ is a subsonic flow correction factor for the EGR having the following form:

$$G_s(P_m/P_{exh})=\gamma^{1/2}(2/(\gamma+1))^{(\gamma+1)/(2(\gamma-1))}$$

for $(P_m/P_{exh}) \leq (2/(\gamma+1))^{\gamma/(\gamma-1)}$, otherwise:

$$G_s(P_m/P_{exh})=[(2\gamma/(\gamma-1))((P_m/P_{exh})^{2/\gamma}-(P_m/P_{exh})^{(\gamma+1)/\gamma})]^{1/2}$$

where $\gamma$ represents the ratio of the pressure specific heat constant to volume specific heat constant; and computing $VGT_{p,c}(k)$ according to the following equation:

$$VGT_{p,c}(k)=\Psi_{vgt}^{-1}((T_{exh}(k)/T_{nom})^{1/2}m_{turb,c}(k)P_{nom}/(P_{exh}(k)G_s(P_a(k)/P_{exh}(k))))$$

wherein $\Psi_{egr}$ is the VGT flow characteristic dependent upon the flow area of the opening and the discharge coefficient for the VGT.

* * * * *